H. F. BRIGGS.
LOCK FOR SPARE TIRE RIMS.
APPLICATION FILED JUNE 23, 1920.
1,438,574.
Patented Dec. 12, 1922.
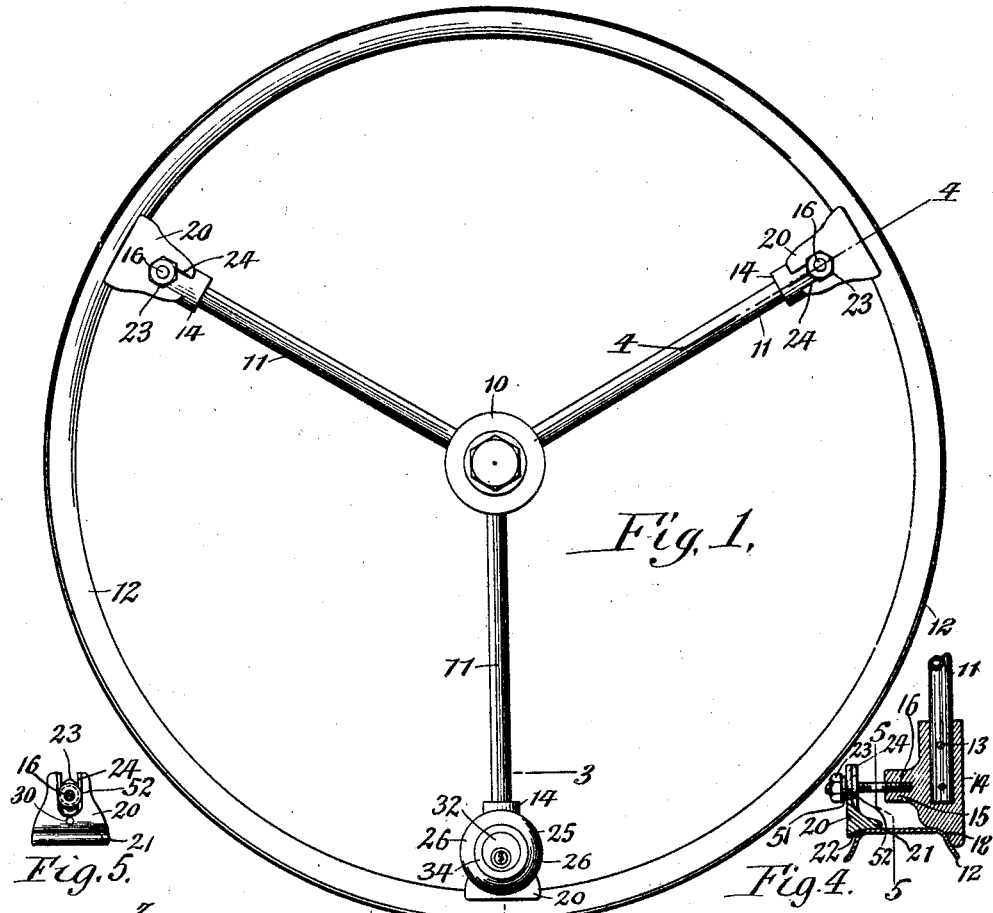
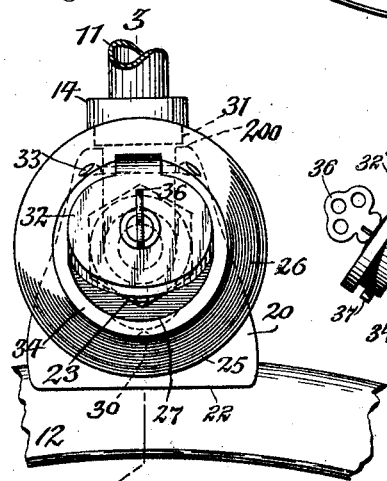
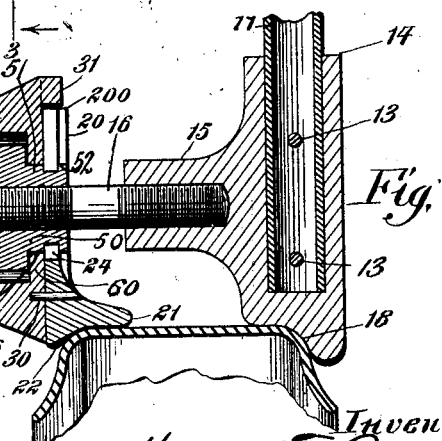

Patented Dec. 12, 1922.

1,438,574

UNITED STATES PATENT OFFICE.

HOWLAND FRANKLIN BRIGGS, OF BUFFALO, NEW YORK.

LOCK FOR SPARE-TIRE RIMS.

Application filed June 23, 1920. Serial No. 391,006.

*To all whom it may concern:*

Be it known that I, HOWLAND F. BRIGGS, a citizen of the United States, residing in Buffalo, in the county of Erie and State of New York, have invented new and useful Improvements in Locks for Spare-Tire Rims, of the following is a specification.

This invention relates to a means for preventing the theft of the spare tires which are usually carried at the rear of automobiles.

The object of the invention is to produce an inexpensive automobile tire lock which may be applied to any standard spare tire support now in use and which will absolutely operate to prevent the theft of spare tires.

In the accompanying drawings: Figure 1 is a rear elevation of a typical automobile spare tire support shown supporting a typical metal tire rim and equipped with the improved tire lock which is the subject of this invention. Figure 2 is a fragmentary enlarged rear elevation of the improved tire lock and associated parts. Figure 3 is an enlarged fragmentary vertical longitudinal section through the tire lock and associated parts taken on line 3—3, Figs. 1 and 2. Figure 4 is a fragmentary section taken on line 4—4, Fig. 1. Figure 5 is a transverse section taken on line 5—5, Fig. 4.

Similar characters of reference refer to like parts throughout the several views.

It is customary in automobile practice at the present day, to mount an extra or "spare" automobile tire with its metal rim at the rear part of the automobile chassis so that the complete tire and rim are conveniently available for use as an entire unit should any of the tires of the car either develop a leak or a blow out. Such a spare tire is ordinarily a very tempting object to a thief and it is the object of this invention to practically prevent a thief from stealing a spare tire.

The spare tire support and its accoutrements vary considerably in construction on different makes of cars, but the drawings disclose one typical form in which a central or concentric spare tire support head 10 is suitably secured to the automobile body or chassis and is provided with three radial— supporting arms 11 whose outer ends detachably support the usual metal rim 12 of a pneumatic or other automobile tire (not shown). Secured by pins 13 or otherwise to the outer end of each of said supporting arms is a bracket 14 upon whose front face is formed a suitable annular boss 15. The outer or lower part of said bracket 14 is suitably notched at 18 and is thereby adapted to receive the rear or inner edge of the metal rim 12.

Upon each of these brackets is mounted means for clamping the spare tire thereto and if desired my invention may be combined with each of these clamping devices but in practice only one of the clamping devices need be thus equipped while the remaining clamping devices are of ordinary or usual construction. As shown in Figs. 1, 4 and 5 of the drawings, the ordinary clamping device includes an ordinary rim clip 20 which is provided with a rearwardly projecting flange 21 having an inclined outer face 22 adapted to engage the inner front corner of the spare tire rim. The inner part of this clip is provided with a longitudinal slot 24 which is radial with reference to the axis of the spare tire rim holder. On this clip is mounted a screw nut having a hexagonal outer part 23, a reduced rear neck 50 arranged in said slot, and front and rear flanges collars or shoulders 51, 52 engaging with the front and rear sides of the slotted part of the clip. A lag screw 16 engages its rear thread end with each of the bosses 15 while the threaded front end is engaged by the thread of the screw nut so that by tightening the latter the clip will be drawn against the spare tire rim.

In the preferred construction, two of such ordinary fastenings are employed on the upper part of the tire holder on opposite sides of its center and a single fastening device provided with my locking device, is employed on the lower central part of the tire holder.

The preferred form of the locking device containing my invention and applied to the lower fastening device as shown in Figs. 1, 2 and 3, is constructed as follows:—

25 represents a cup-shaped casing which rests with its bottom or transverse end wall 60 against the front side of the slotted body 20 of the lower clip and is provided in its bottom with an opening 53 which receives the front flange or collar 51 of the clamping nut so that the bottom of the latter is confined between the body of the clamping screw nut and the front side of the clip. The peripheral surface of the lock casing 25 is beveled or tapered forwardly, as shown at 26 in Fig. 3 to prevent an unauthorized person from using a wrench upon said outer surface and thereby attempting to twist the whole casing around bodily. The cavity or bore 27 of said casing is but slightly larger than the extreme diameter of the hexagonal body 23 of the tire rim nut which requires a socket wrench having very thin outer walls to turn the same, so that an unauthorized person is still more discomfited in any attempt to remove the tire. To prevent turning of the casing 25 relatively to the rim clip 20, a suitable hole may be drilled into the outer face of the rim clip and a similar hole also be drilled into the rear face of said casing, the said holes being adapted to receive a longitudinally disposed dowel pin 30. The same mechanical effect or advantage as is rendered by this pin may also be obtained by forming a stop or torque lug 31 upon the upper rear face of the casing 25, said lug projecting rearward over the upper horizontal edge 200 of the rim clip 20. If the construction of the spare tire support and its appurtenances is such that the said lug 31 bears snugly against an adjacent surface of the rim clip then this lug is sufficient and the use of the pin 30 and the drilling of the hole in the rim clip may be dispensed with. Where, however, this torque lug 31 is rendered inoperative by reason of the construction of the spare tire support, then the torque pin is utilized, the same being driven permanently into either the rim clip 20 or the casing 25 as may be found most desirable.

Immediate access by an unauthorized person to the screw nut of the rim fastening bolt is further prevented by means of a hinged lid or concealing plate 32 which is suitably and permanently pivoted to the casing 25 at 33 and is adapted to swing inside the bore 27 of said casing so that when said cover is closed, its vertical front or outer surface is flush with the vertical front, flattened edge 34 of said casing, thus rendering extremely difficult any prying open of said cover 32 by means of a screw driver or other implement. Suitably secured to the inner face of said cover, is an ordinary lock 35 which is operable by an ordinary removable key 36. When said cover is closed the tongue or sliding bolt 37 of said lock is adapted to be received within a semi-circular recess 38 which is transversely formed in the bore 27 of the casing a short distance rearwardly of the front lower edge of said casing.

It is obvious that the casing may, if desired, be made in one integral piece with the rim clip, but such a construction would be limited in its commercial applicability by reason of the fact that the form of these rim clips varies considerably in different makes of automobiles and therefore a rather large variety of different forms of combined lock clips would have to be carried in stock by each retail dealer. Where however, the lock which is the subject of this invention is made the standard equipment of any certain make of automobiles, then this difficulty vanishes and in such a case the casing and the rim clip may be made integral and supplied as standard equipment on the automobile. It is also obvious that this invention is applicable when a cap screw is used on the spare tire support instead of the stud bolt 16 and the nut 23, such a construction merely being equivalent to making the said stud bolt and nut integral and screwing or unscrewing the same into the internal threads of the boss 15 of the bracket 14, whenever the spare tire is to be mounted upon or removed from the rim support.

I claim as my invention:

1. A tire rim lock comprising a body having a forwardly-opening chamber the rear wall of which is provided with an opening and a key controlled lid movably mounted on the body and adapted to cover and uncover the front end of said chamber, a screw nut rotatable in said chamber and adapted to engage with a bolt on the rim support and having a reduced circular shank which projects rearwardly through the opening in said rear wall and forms a shoulder engaging with the front side of said wall, said shank being provided with a peripheral groove in rear of said wall, a rim clip adapted to engage a tire rim and engaging with said rear wall and having a slot forming a fork the branches of which engage with opposite sides of the groove in said shank, and means for holding said body and clip against transverse movement relatively to each other.

2. A tire rim lock comprising a body having a forwardly-opening chamber the rear wall of which is provided with an opening and a key controlled lid movably mounted on the body and adapted to cover and uncover the front end of said chamber, a screw nut rotatable in said chamber and adapted to engage with a bolt on the rim support and having a reduced circular shank which projects rearwardly through the opening in said rear wall and forms a shoulder engaging with the front side of said wall, said shank being provided with a peripheral groove in rear of said wall, a rim clip adapted to engage a tire rim and engaging with said rear wall and having a slot forming a fork the branches of which engage with opposite sides of the groove in said shank, a lug arranged on the rear side of said body and extending across the outer end of the slot in said clip, and means for holding said body and clip against transverse movement relatively to each other.

HOWLAND FRANKLIN BRIGGS.